United States Patent [19]

Ariga et al.

[11] Patent Number: 4,505,774

[45] Date of Patent: Mar. 19, 1985

[54] INSTRUMENT PANEL MANUFACTURING SYSTEM

[75] Inventors: Yoshio Ariga; Yoshiki Ishige; Shogi Satoh; Masao Tegawa; Toshiyuki Kinugasa; Toru Yamamoto, all of Saitama, Japan

[73] Assignee: Honda Giken Kogyo Kabushiki Kaisha, Tokyo, Japan

[21] Appl. No.: 500,259

[22] Filed: Jun. 2, 1983

[30] Foreign Application Priority Data

| Jun. 4, 1982 | [JP] | Japan | 57-95808 |
| Jun. 7, 1982 | [JP] | Japan | 57-84174[U] |
| Jun. 7, 1982 | [JP] | Japan | 57-84175[U] |
| Jun. 10, 1982 | [JP] | Japan | 57-86504[U] |
| Jun. 15, 1982 | [JP] | Japan | 57-102662 |
| Jun. 15, 1982 | [JP] | Japan | 57-89386[U] |

[51] Int. Cl.³ ............................................. B32B 35/00
[52] U.S. Cl. ................................. 156/499; 156/500; 156/538; 156/556
[58] Field of Search ............... 156/381, 382, 499, 500, 156/538, 556, 391

[56] References Cited

U.S. PATENT DOCUMENTS

| 3,792,952 | 2/1974 | Hamon | 425/343 |
| 4,242,172 | 12/1980 | Fujii | 156/499 |
| 4,253,891 | 3/1981 | Brussel | 156/538 |
| 4,257,840 | 3/1981 | Fujii | 156/556 |

FOREIGN PATENT DOCUMENTS

| 155719 | 12/1981 | Japan. |
| 1003036 | 9/1965 | United Kingdom. |
| 1447110 | 8/1976 | United Kingdom. |

Primary Examiner—Caleb Weston
Attorney, Agent, or Firm—Irving M. Weiner; Pamela S. Burt

[57] ABSTRACT

An instrument panel manufacturing system including a press forming device for the unit sheet and the core member having a feeding device and a heating device therefor.

The feeding device (2) is provided with a suction device (20) for the unit sheet which is movable up and down, and the running rails (14) for the conveying bogie (21) are arranged between the sheet mounting position for the bogie and the conveying position so as to be movable up and down. The heating unit (3) is provided with lower rails (47) and upper rails (46) and includes a heater (48), and further a drying and melting device (101) having a drying chamber (102) and a melting chamber for the adhesive (65a) coated on the surface of the core member (65) is integrally arranged with the heating device (3). The forming device is provided with auxiliary rams (59) which are moved up and down separately from the lower die (55) and support the bogie running rails (61), the lower die (66) can be moved along the rails (223, 233) on the base block (49, 219) and an item expelling block (68, 232), and further the item expelling block (68, 232) can be inclined.

17 Claims, 20 Drawing Figures

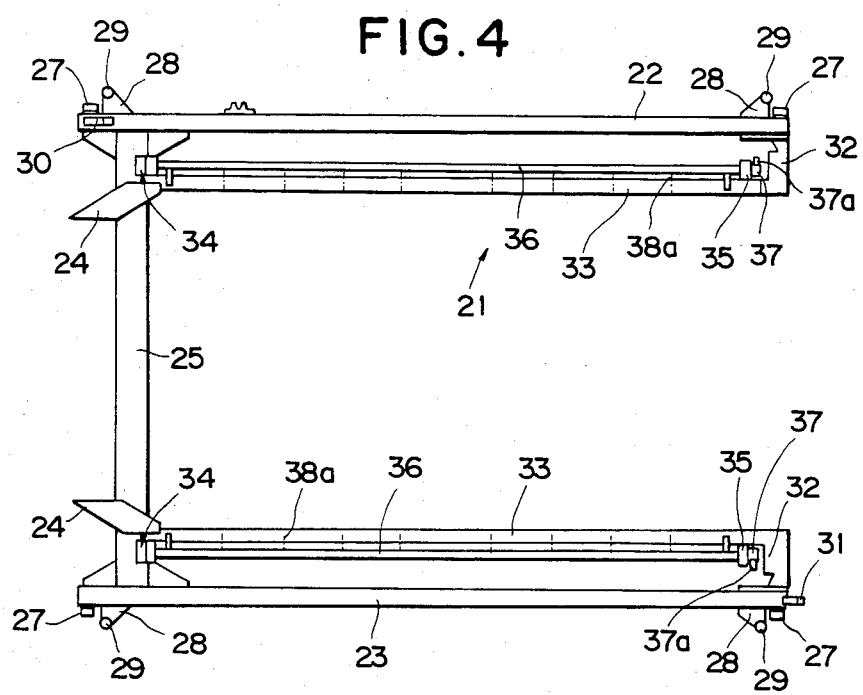
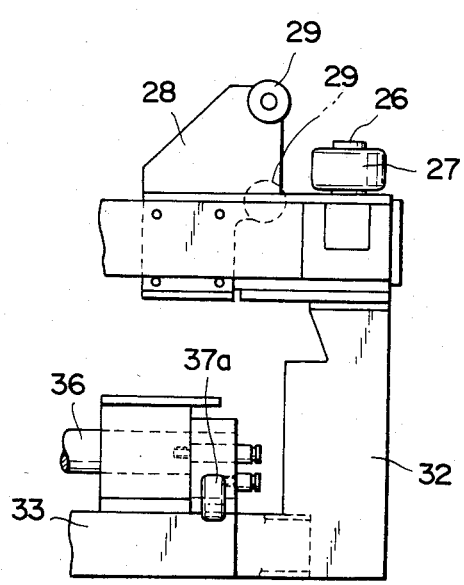
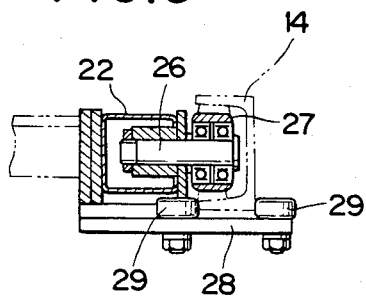

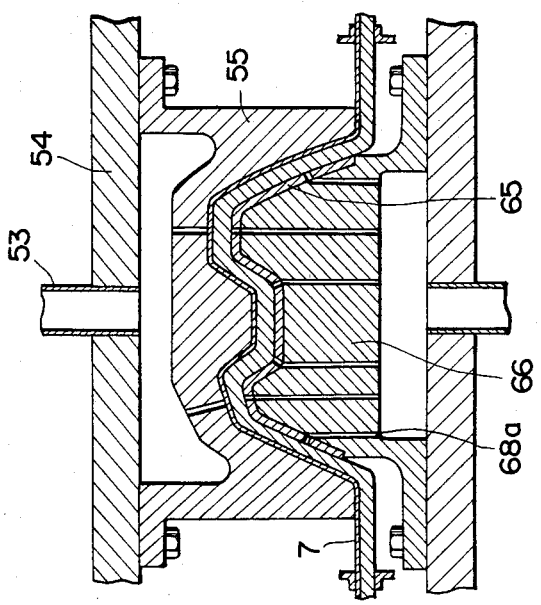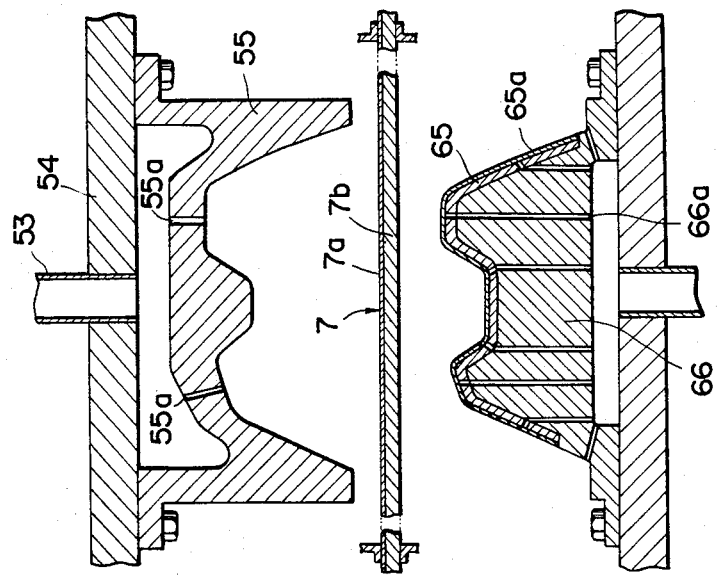

INSTRUMENT PANEL MANUFACTURING SYSTEM

BACKGROUND OF THE INVENTION

1. Field of Invention

This invention relates to a system for manufacturing an instrument panel which is primarily used in the interior construction of an automobile.

2. Description of the Relevant Art

In general, an instrument panel is constructed such that a foamed resin of polypropyrene or the like is placed between a hard core material (aggregate) of ABS resin or the like and a soft covering material such as polyvinyl chloride. In a conventional manufacturing process for such an instrument panel, beads of a foaming resin material are filled in a space between the core member and the covering material when formed, and are then heated and foamed. Due to this process, the prior art has various attendant problems in as much as a longer period of operation is required for making a foamed resin, and further, irritating gas is produced when the resin is foamed. In order to resolve such problems, proposals have been made by the present applicants in Japanese Patent Laid-Open No. 54-144,478.

In the aforesaid known system a composite sheet having a semi-hard covering material and a foamed sheet adhered to each other in advance is cut to a desired length of a unit sheet and the unit sheet is guided to the heating station where it is heated to its softening point, thereafter the heated unit sheet is fed to the forming station where it is pressed against the core member set on the lower die in advance, through adhesive, and then finally it is pressed between the upper and lower dies. Further, in this prior art system of manufacturing an instrument panel, endless conveying chains are arranged to run through the feeding, heating and forming stations, respectively, and during this passage of the sheet panel, the sheet is spiked by some needles formed on the running chain the conveyed through each of the stations in sequence while being spiked. Due to this operational arrangement, the sheet should be conveyed through each of the stations with its positional relation to each of them being retained therein, and thus an independent processing of the sheet in each of the stations cannot be performed. Because the conveying chains pass through the heating station, they are always required to be cooled thus influencing the durability of the conveying chains. Further, an arrangement of the conveying chains in the forming station causes problems in that a sheet forming process is restricted and the like. With such arrangement as set forth above, two devices, one for drying the adhesive applied to the surface of the core member and the other for additionally heating the dried adhesive to melt it, are installed for processing the core member before the forming of the sheet material due to different temperature conditions therebetween.

Due to this fact, an additional process for taking the core member from the drying device and transferring it to the melting device is required, and the area occupied by these devices is excessive, resulting in a decreased efficiency of the entire system. Further, because the heater, etc. should be arranged for each of the devices, the prior art system has the problem that a desirable thermal efficiency cannot be retained.

Further, in such a prior art system, the feeding station has a suction device for sucking the unit sheet cut to a desired length and a bogie device for transferring said unit sheet to the subsequent heating station at respective different locations. Due to this fact, an operation required for transferring the unit sheet to the bogie additionally requires time for transferring the sheet from the suction device to the bogie device, and further occupies an excessively large area the feeding station.

Further, in such a prior art system, problems arise in that the conveying chains themselves cannot be lifted up and down, and alternatively the upper and lower dies are required to be moved up and down and the lower die should be movable, resulting in a complex and large-sized device.

In the forming station, in order to set the core member on the lower die, an operator sets the core member while he enters a space between the dies and also in case of taking out the formed product of the instrument panel upon completion of the forming process, the product is pushed up by the ejector and the operator enters the space between the dies to take the product. Therefore, this is undesirable in view of workability and safety of the operator.

The present invention effectively overcomes the above problems found in a conventional type of an instrument panel manufacturing system as described above.

SUMMARY OF THE INVENTION

Therefore, it is a major object of the present invention to provide an instrument panel manufacturing system in which the most suitable operating condition can be selected for each of the feeding, heating and forming stations, respectively, a high durability can be retained and a forming process itself is not restricted.

It is another object of the present invention to provide an instrument panel manufacturing system in which a sheet transferring operation is eliminated under a combined assembly of two separate devices conventionally required for processing the core member prepared in advance, an occupied area is small, an advantageous effect with regard to cost can be retained and a thermal efficiency can be improved.

It is a still further object of the present invention to provide an instrument panel manufacturing system in which a suction of the unit sheet and a transferring of said sheet to the transferring bogie are performed with one device in a feeding station only, a short processing time is required, and an entire compact device can be obtained.

It is yet a further object of the present invention to provide an instrument panel manufacturing system in which the unit sheet can be located at any forming position, a lower die is not required to be moved up and down and no restriction in forming process is imposed.

It is an additional object of the present invention to provide an instrument panel manufacturing system in which both a setting of the unit sheet in a forming station and a removal of the formed product can easily be performed, and a high workability and superior safety can be attained.

The present invention provides an instrument panel manufacturing system including means for feeding a unit sheet; means for heating the sheet; means for pressing the heated sheet against a core member having adhesive coated on a surface thereof and for forming it thereon; first rails provided in the feeding means and, movable up and down between a raised position and a lowered position and substantially extending in a lateral direction;

upper rails and lower rails arranged in the heating means at the locations corresponding to the raised postion and the lowered position, respectively; heater means arranged along the upper side and lower side of the upper rails; auxiliary rams provided in the pressing-forming means and movable up and down between a first position and a second position which corresponds to the upper rails and the lower rails of the heating means, respectively; second rails fixed to the auxiliary rams; a bogie adapted to run on the first rails, the upper rails, the lower rails and the second rails and removably holding the unit sheet; and a driving means for advancing and retracting the bogie.

The instrument panel manufacturing system further includes means for drying and melting the adhesive coated on the surface of the core member. The means for drying and melting the adhesive has a drying chamber for drying the adhesive; a melting chamber arranged in continuous relation with the drying chamber and having a heater arranged therein to heat the dried adhesive to melt the same; and conveying means for conveying the core member through the drying chamber to the melting chamber.

The feeding means of the instrument panel manufacturing system includes a suction means which can be moved up and down, and is provided with suction elements for sucking the unit sheet to hold it.

The pressing-forming means further includes, a base block provided with a lower die on which the core member is mounted; columns arranged vertically on the base block; and a movable plate provided with an upper die and fitted onto the columns in such a manner that they can be moved up and down along the columns. The auxiliary rams are fitted on the columns between the base block and the movable plate. The lower die is provided at its lower surface with moving rollers.

The pressing-forming means further includes third rails arranged below the lower die movable up and down and adapted to contact with the rollers at their upper limit position; slide cylinders for moving the lower die along the third rails; a formed item expelling block arranged adjacent to the base block; and fourth rails arranged on the expelling block and positioned at the locations corresponding to the third rails at their upper limit positions.

The formed item expelling block can be inclined.

Other objects and advantages of the present invention will become apparent from the following description which is made with reference to the accompanying drawings.

BRIEF DESCRIPTION OF THE DRAWINGS

FIG. 4 is a top plan view for showing a bogie for conveying a unit sheet.

FIG. 5 is an enlarged view showing a front end of the bogie shown in FIG. 4.

FIG. 6 is a partial broken-away side elevational view showing a a front end of the bogie shown in FIG. 5.

FIGS. 14 and 15 are sectional views showing a cooperative relation between upper and lower dies before the forming operation is performed and when the forming is performed in the forming device, respectively.

DETAILED DESCRIPTION OF THE INVENTION

Figure 1:
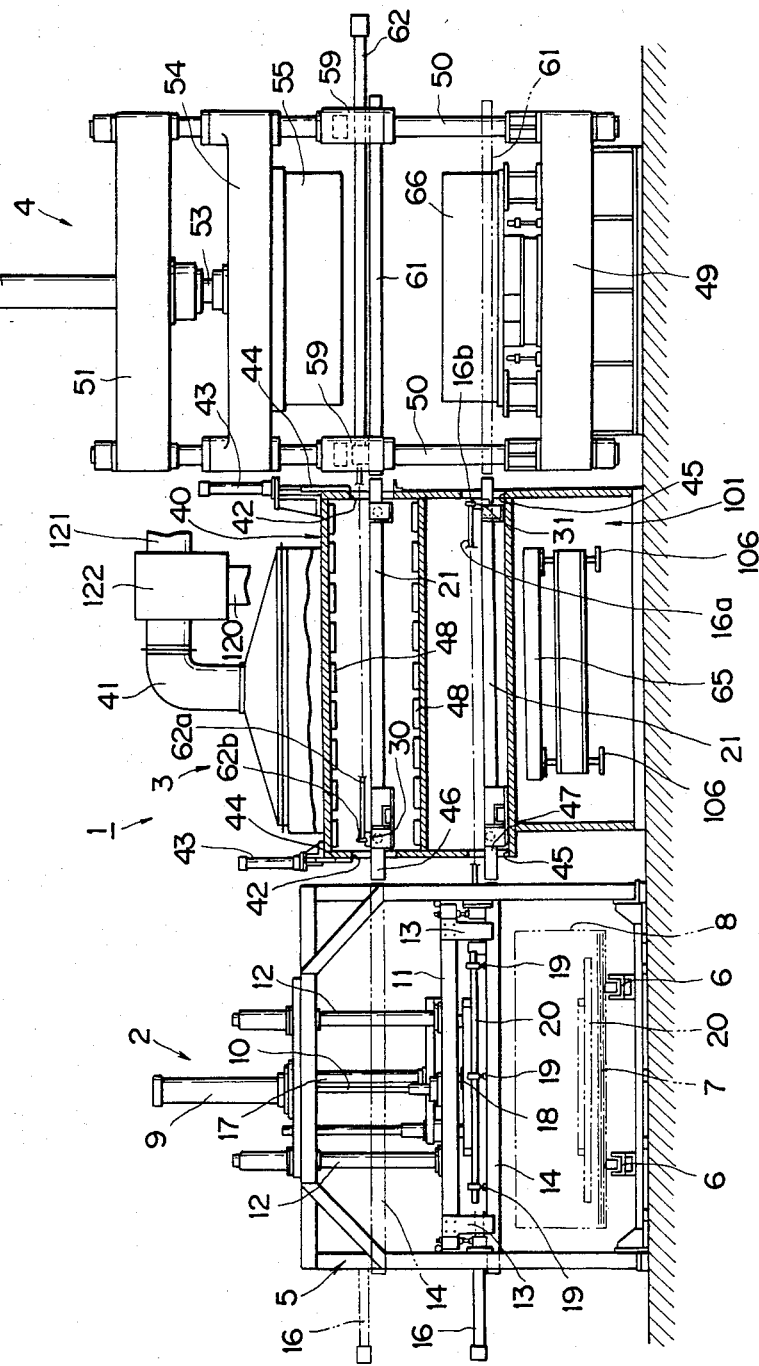
FIG. 1 is a front elevational view showing an entire instrument panel manufacturing system constructed in accordance with the present invention.

With reference to FIG. 1, the instrument panel manufacturing system 1 comprises each of the sheet feeding, heating and forming stations, respectively, and in the sheet feeding station is arranged a sheet feeder device 2, in the heating station a heater device 3 and in the forming station a forming device 4, respectively.

Figure 2:
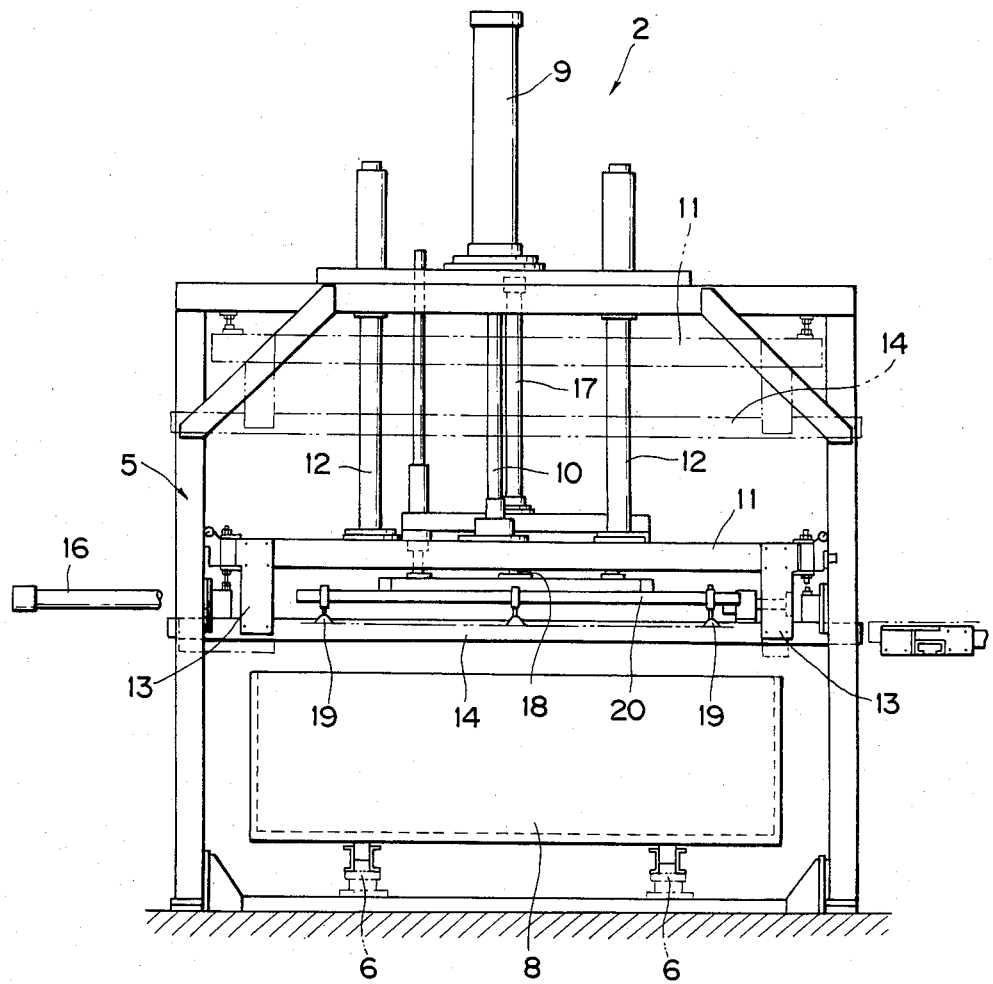
FIG. 2 is an enlarged view showing a unit sheet feeding device shown in FIG. 1.
Figure 3:
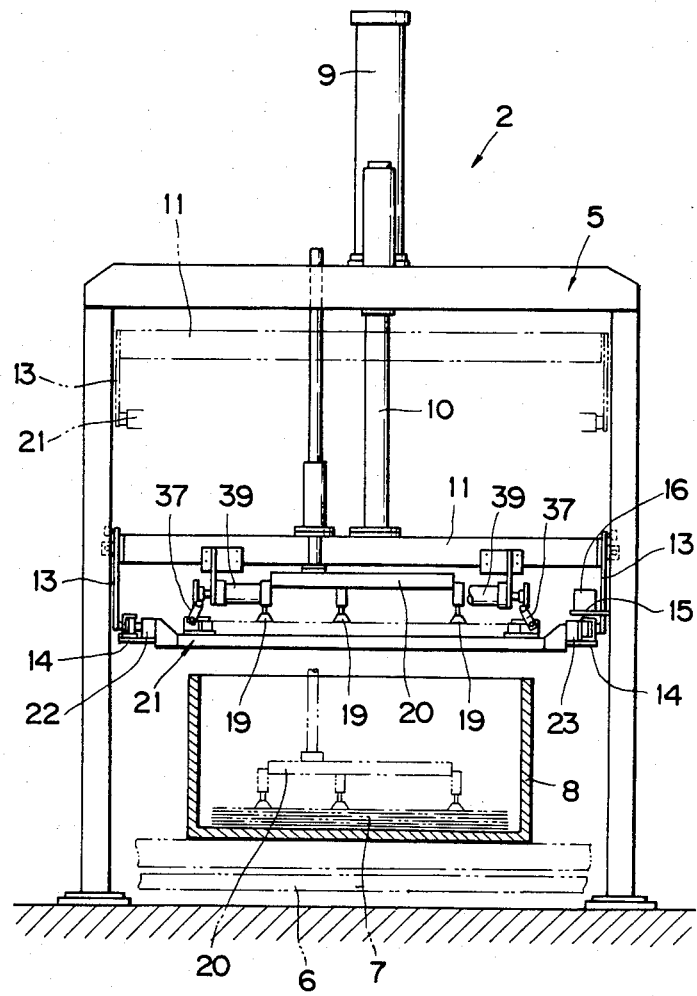
FIG. 3 is a side elevational view showing the device in FIG. 2.

In the sheet feeder device 2, as shown in FIGS. 2 and 3, rails 6 are arranged below the frame 5 constructed of iron members. Sheet pallet 8 storing a number of unit sheets 7 can be fed in and out of the sheet feeder device 2 through rails 6, the unit sheets 7 being formed of a semi-hard covering material such as polyvinyl chloride adhered to a foamed sheet and then cut to a desired length.

At the upper part of the frame 5 is arranged a movable plate lift cylinder 9. To the lower end of a piston rod 10 in the lift cylinder 9 is mounted a movable plate 11, and the movable plate 11 can be moved up and down in the frame 5 along rods 12, 12. At both ends of the movable plate 11 are vertically arranged support plates 13, 13. Rails 14 are held by the support plates 13, 13. Further, one of the support plates 13, 13 is provided with a mounting plate 15, and on this mounting plate 15 is fixed a cylinder 16 for use in advancing and retracting a bogie 21 along the rails 14. The movable plate 11 is provided with a pair of cylinders 39 at its lower surface opposing facing relation to each other in a direction crossing with the rails 14. Thus, as the movable plate 11 is moved up and down, the rails 14 and cylinders 16, 39 are also moved up and down.

To the movable plate 11 is fixed a lift cylinder 17 for the suction device. To the lower end of a piston rod 18 in the lift cylinder 17 is fixed a suction device 20 provided with vacuum cups 19. The suction device 20 is lowered under an operation of the lift cylinder 17 to suck the unit sheet 7 in the sheet pallet 8 and bring it up. The cylinder 17 may alternatively not be fixed to the movable plate 11, but may instead be fixed to the frame 5.

The rails 14 are formed in a shape having a channel-section with the groove being opened. To the rails 14 is fitted a bogie 21 to run therein so as to transfer the unit sheet as shown in FIGS. 4 to 8. The bogie 21 will be described with reference to a condition where the rightward direction shown in FIG. 4 corresponds to the transferring direction, wherein a cross member 25 having the sheet guide plates 24, 24 is mounted between the left end parts of the parallel lateral members 22, 23 so as to form a channel shape with its right end as viewed in a top plan being opened. The lateral members 22, 23 are provided, at the outer sides of both ends thereof, with fitting portions to the rails as shown in FIGS. 5 and 6. That is, with reference to an example of the right end of the lateral member 22, a shaft 26 is fitted into the lateral member 22 from outside thereof, and a roller 27 running in the groove of the rail 14 is rotatably arranged on the shaft 26. At the lower surface of the end of the lateral member 22 is fitted a plurality of supporting pieces 28 projected outwardly and the supporting pieces 28 are rotatably provided with small rollers 29, 29 for holding the lower end of the rail 14.

Figure 7:
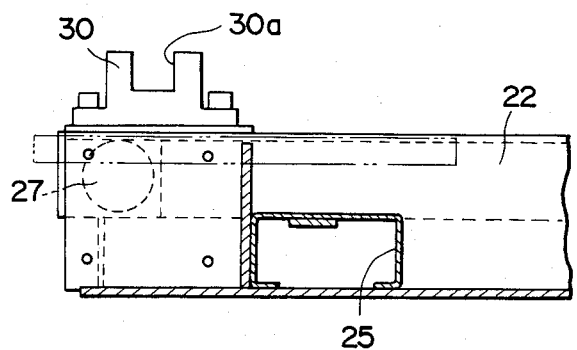
FIG. 7 is a partial broken-away front elevational view showing a rear end of the bogie shown in FIG. 4.
Figure 8:
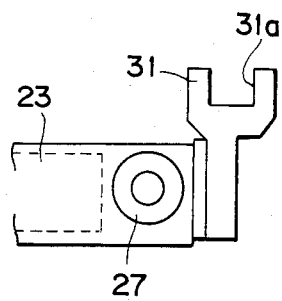
FIG. 8 is an enlarged front elevational view showing an engaging member fixed to both ends of the bogie shown in FIG. 4.

At the upper surface of the left end part of the lateral member 22, as shown in FIG. 7, is fixed an engaging member 30 formed with a top-opened groove 30a. Also to the right end of the lateral member 23 is fixed an engaging member 31 having a top-opened groove 31a as shown in FIG. 8. Thus, an engaging piece 16b fitted onto the extremity end of the rod 16a of the cylinder 16 for advancing or retracting the bogie 21 (or an engaging piece of a cylinder arranged in the forming device 4 described hereinbelow) is fitted to the grooves in the engaging members 30, 31, and the cylinder is operated to thereby cause the bogie 21 to run along the rails.

Figure 9A:
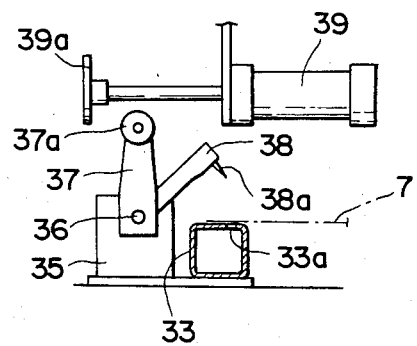
FIG. 9(A) and FIG. 9(B) are partial enlarged views showing a condition of the bogie before it holds a unit sheet and a condition of a unit sheet being held, respectively.
Figure 9B:
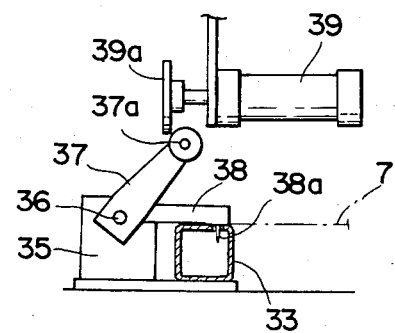

To the right ends of the lateral members 22, 23 are fitted inwardly fitted supporting pieces 32, 32. Between the supporting pieces 32 and the cross member 25 is arranged a rectangular hollow pipe 33 having a plurality of holes 33a at the desired points in the upper surface thereof as shown in FIG. 9A. Between brackets 34 and brackets 35 mounted upright on the cross member 25 and the supporting piece 32, respectively, near both ends of the rectangular pipe 33, are inserted shafts 36. At the right end of the shafts 36, as shown in FIG. 9A, is inserted and fitted a base part of an operating arm 37 having a roller 37a fitted at an extremity end thereof, so as to integrally rotate with the shaft 36. To the shaft 36 are fixed the clamp arms 38 having needles 38a at their ends, with the same intervals as that of holes 33a in the rectangular pipe 33 and with a displacement of a desired angle with respect to the operating arm 37 about the shaft 36. Thus, as shown in FIG. 3, when the cylinders 39 fixed to the movable plate 11 are retracted from a condition in which the extremity end 39a of the rod in the cylinder 39 is placed outside the operating arm 37, the extremity end 39a is abutted against the arm 37 to cause it to rotate in a clockwise direction as shown in FIG. 9B. Along with this rotation, the shaft 36 is also rotated and this rotation of the shaft 36 causes the clamp arm 38 to fall, and the needles 38a placed on the clamp arm 38 spike through the end of the sheet 7 set on the upper surface of the rectangular pipe 33 into the holes 33a, and thereby the bogie 21 holds the end of the sheet 7.

Referring now to FIG. 1, the heater 3 arranged adjacent to the sheet feeder device 2 has an exhaust duct 41 at the top part of the box-shaped main body 40 thereof. Openings 42, 42 are formed at the upper parts of the right and left side walls of the main body 40, and these openings 42, 42 are opened or closed by doors 44, 44 moved up and down under an operation of cylinders 43, 43. Openings 45, 45 are also formed at the lower parts of the right and left side walls of the main body 40. Upper rails 46 are fixed at the position in the main body 40 which has the same level as that of the ascending ends of the liftable rails 14 arranged in the sheet feeder device 2, and the upper rails 46 are projected, at their ends, from the right and left upper openings 42, 42. Lower rails 47 are fixed at the positions in the main body 40 having the same level as that of the descending ends of the rails 14, and the lower rails 47 are projected, at their ends, from the right and left lower openings 45, 45. Further, heaters 48, 48 are arranged at the upper and lower positions of the upper rails 46.

Below the main body 40 of the heater device 3 is disposed a drying chamber 102 for drying adhesive coated on the core member 65 which is forcibly contacted with the unit sheet 7. The drying chamber constitutes a part of a drying and melting device described as hereinbelow.

Figure 10:
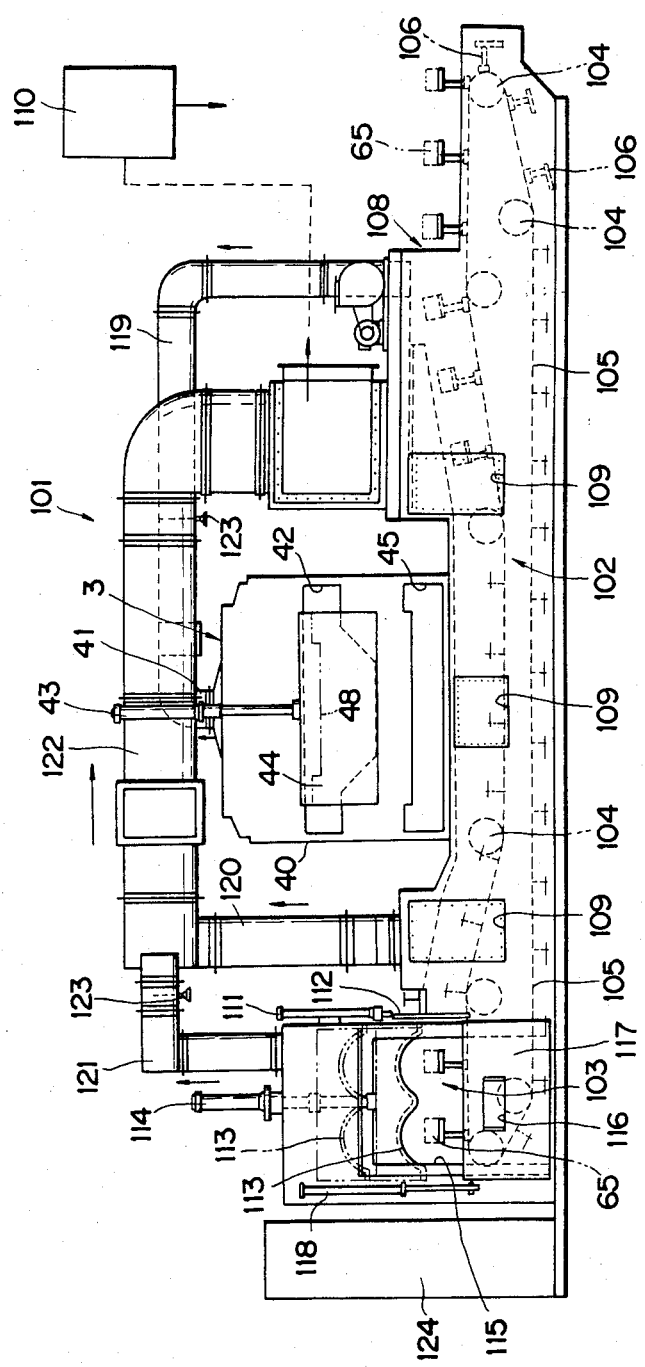
FIG. 10 is an overall side elevational view showing an adhesive drying and melting device.
Figure 11:
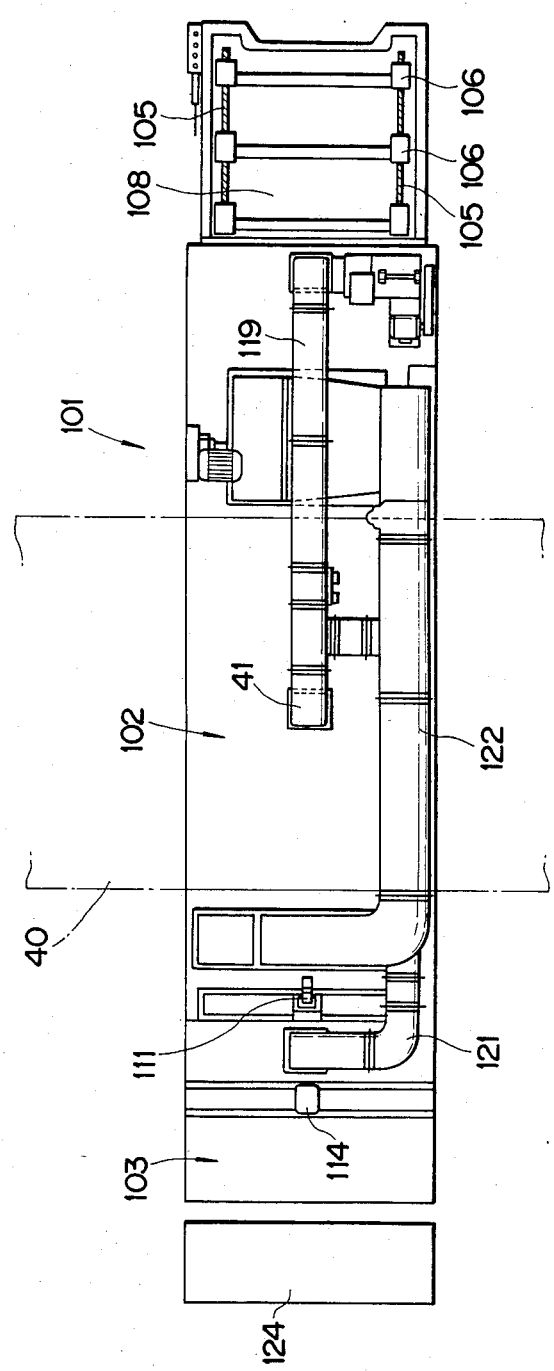
FIG. 11 is a top plan view showing the device shown in FIG. 10.

With reference to FIGS. 10 and 11, a drying and melting device 101 has a drying chamber 102 and a melting chamber 103 arranged in series, sprockets 104 are arranged at the desired points in the drying chamber 102 and the melting chamber 103, a chain conveyor 105 is wound around these sprockets 104 and a plurality of trays 106 are fixed to a chain conveyor 105 at a specified interval.

At the end of the drying chamber 102 opposite to the melting chamber 103 is formed a workpieces feeding port 108 for placing core members 65 of workpiece on the trays 106 and feeding them into the drying chamber 102, and hot air blowing ports 109 are formed in the side wall and the top wall of the drying chamber 102. The hot air from a blower 110 provided with a temperature adjuster placed adjacent to the device 101 is blown into the drying chamber 102 through the hot air blowing ports 109.

Hydraulic cylinders 111 are fixed to the side wall of melting chamber 103 facing the drying chamber 102, a shutter 112 is fixed to the rods in the cylinders 111, and the shutter 112 operates to open and close an interface between the drying chamber 102 and the melting chamber 103 under the operation of the cylinders 111. In the melting chamber 103 is disposed a panel heater 113 having a shape adapted to cover the core member 65, the panel heater 113 being moved up and down under an operation of a lift cylinder 114 mounted at the upper part of the melting chamber 103 to allow a heating temperature, etc. at the surface of the core member 65 to be adjusted. The front wall of the melting chamber 103 is formed with an expelling opening 115 for the core members 65, and a door 117 formed with a sight hole 116 made of a heat-resistant glass is installed in the expelling opening 115. Rods of hydraulic cylinders 118 are fixed to the door 117 and the expelling opening 115 is opened or closed under an operation of the hydraulic cylinders 118.

Exhaust ducts 119, 120 are mounted upright at the front and rear ends of the drying chamber 102, respectively, and an exhaust duct 121 is also mounted upright at the melting chamber 103. The exhaust ducts 120, 121 are connected to an assembly duct 122, and the exhuast duct 119 and the exhaust duct 41 at the main body 40 of the heater device are assembled together and connected to the assembly duct 122. Exhuast gas collected in the assembly duct 122 is fed to the blower 110 and its temperature is adjusted in the blower 110, then the gas is fed again to the drying chamber 102 through a hot air blowing port 109. The exhuast ducts 119 and 121 are provided with air volume adjusting dampers 123.

Operation of the drying and melting devices 102 and 103 constructed as above will be described as herein below.

First, core members 65 are placed on the trays 106 at the workpiece feeding port 108, and the control panel 124 disposed at the side of the melting chamber 103 is operated to drive the chain conveyors 105. Then, the core members 65 placed on the trays 106 are transferred into the drying chamber 102 and during their passage in the drying chamber 102, the solvent in the adhesive coated on the surfaces of the core members 65 is dispersed by hot air fed from the hot air blowing port 109, and then the adhesive is dryed.

The core members 65 having adhesive coated on their surfaces and dried are conveyed into the melting chamber 103 while remaining placed on the trays 106. Thereafter, the control panel 124 is operated to stop the chain conveyors 105 temporarily, the operated to stop the chain conveyors 105 temporarily, the cylinders 111 are operated to lower the shutter 112 to close off the drying chamber 102 from the melting chamber 103, the cylinder 114 is operated to lower the panel heater 113 and the core members are heated to about 140° C. to 150° C. at the desired positions. Then, the adhesive dried in the surface of the core members 65 is heated and activated.

After the completion of processing is acknowledged through the sight hole 116, the cylinders 118 are operated to lower the door 117, expel the core members 65 at the expelling opening 115, and set them on the lower dies in the forming device.

During these operations, the hot air has dried the core members 65 and hot air fed from the melting chamber 103 are collected, as described above, and returned to the blower 110 provided with a temperature adjuster and recirculated again into the drying chamber 102.

Figure 12:
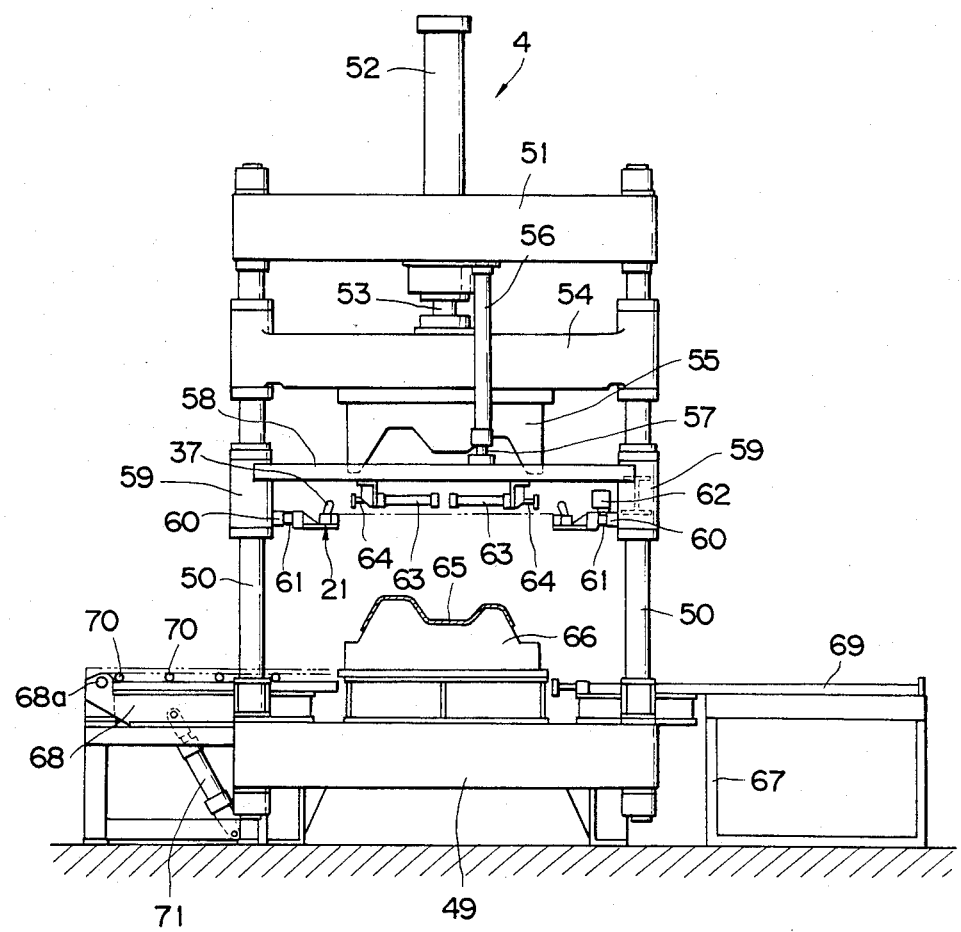
FIG. 12 is a side elevational view showing a part of the forming device shown in FIG. 1.

On the base block 49 in the forming device 4 which is disposed adjacent to the heating device 3 and the adhesive drying and melting device 101 are mounted upright columns 50, as shown in FIGS. 1 and 12, at the four corners thereof, and a fixed plate 51 is fixed on the upper parts of the columns 50. At the fixed plate 51 is arranged a lift cylinder 52 and to the lower end of the rod 53 is fixed a movable plate 54 having its four corners slidably inserted onto the columns 50. At the lower surface of the movable plate 54 is arranged an upper die 55 provided with vacuum suction holes 55a as shown in FIG. 14. Thus, an operation of the cylinder 52 causes the upper die 55 to be moved up and down.

Figure 13:
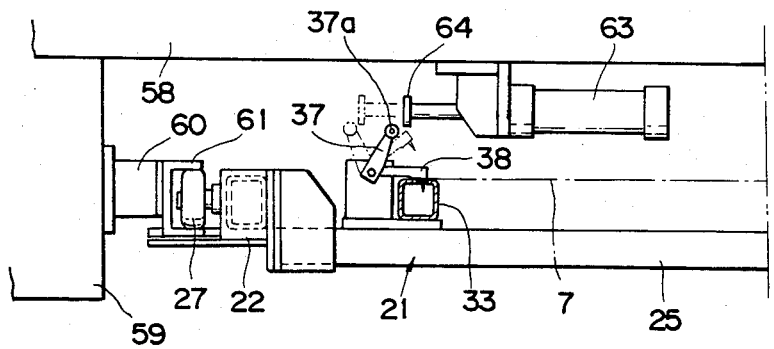
FIG. 13 is a partial enlarged view of FIG. 12 showing a mechanism provided in the forming device for releasing a unit sheet.

At the lower surface of the fixed plate 51 is arranged vertical lift cylinders 56, and a movable plate 58 is fixed to the lower ends of rods 57 in the lift cylinders 56. The movable plate 58 is fixed, at its lower surface, with a pair of hydraulic cylinders 63 and at the four corners with auxiliary rams 59 slidably fitted onto the columns 50. To the auxiliary rams 59, the running rails 61 for the bogie 21 are fixed through brackets 60 projected inwardly as shown in FIG. 13, and one of the brackets 60 is provided with a cylinder 62 which is similar to the cylinder 16 arranged in the sheet feeder device 2. Thus, the auxiliary rams 59 can be moved up and down independently of the moving-up and down of the upper die 55 under an operation of the lift cylinders 56. The arrangement is made such that the rails 61 disposed at the auxiliary rams 59 at the lifting ends of the auxiliary rams 59 are at substantially the same level as that of the upper rails 46, and the rails 61 at the descending ends of the auxiliary rams 59 are at substantially the same level as that of the lower rails 47 disposed at heating device 3. Thus, with the same level of the upper rails 46 and the rails 61, the bogie 21 holding the heated sheet 7 is transferred onto the rails 61 under the operation of the cylinders 62. Rods 64, 64 in a pair of cylinders 63, 63 arranged at the lower surface of the movable plate 58 are projected to cause, as shown in FIG. 13, an operating arm 37 to rotate in a counter-clockwise direction, so that the clamp arms 38 are also raised, and thereby a holding condition of the sheet 7 by the bogie 21 is released when the sheet 7 is held between the lower die 66 having the core member 65 mounted thereon and the upper die 55, or just before performing such holding operation.

On the base block 49 is mounted a lower die 66. The lower die 66 forms, as shown in FIG. 14, a plurality of vaccumn suction holes 66a and a hard core member 65 made of ABS resin having adhesive 65a coated thereon covers the upper surface thereof.

At the rear part of the base block 49 (right-hand side in FIG. 12) is arranged a supporting block 67 provided with hydraulic cylinders 69 for use in pushing the lower die 66 and retracting it to cause its sliding movement, and at the front part of the base block 49 is arranged a formed item expelling block 68 provided with rollers 70 at its upper surface. The expelling block 68 is rotated around the front ends 68a under an operation of hydraulic cylinders 71 arranged below the expelling block 68 and thus the instrument panel made of the sheet 7 and the core member 65 forcibly pressed can be expelled while the lower die is inclined.

While an overall arrangement of a fundamental constitution of the base block 49 of the forming device 4 has been described above, more details of the preferred construction of the base block for the forming device will be described hereinbelow reference to FIGS. 16 to 19.

Figure 16:
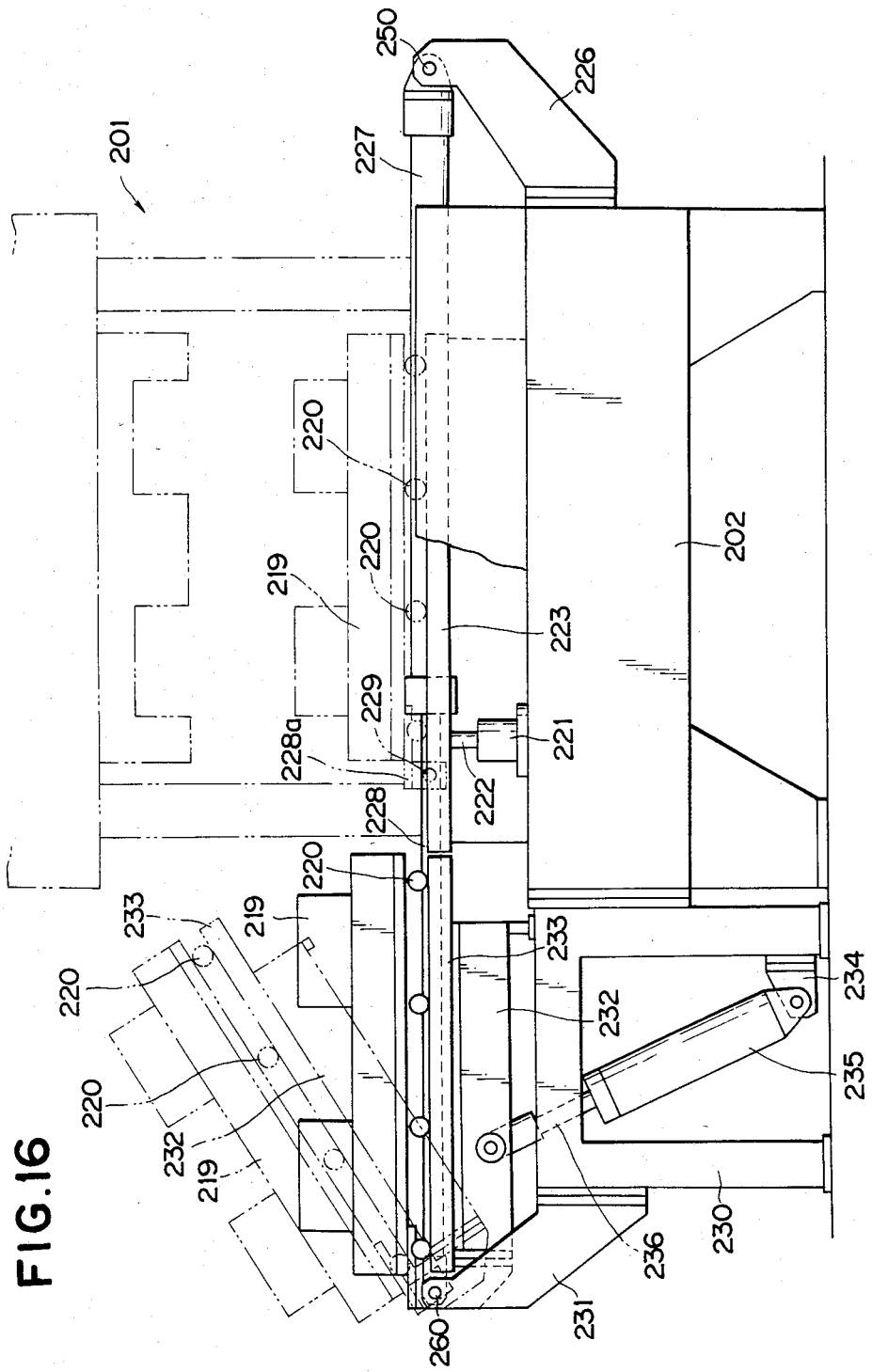
FIG. 16 is an enlarged side elevational view showing a base block in the forming device.
Figure 17:
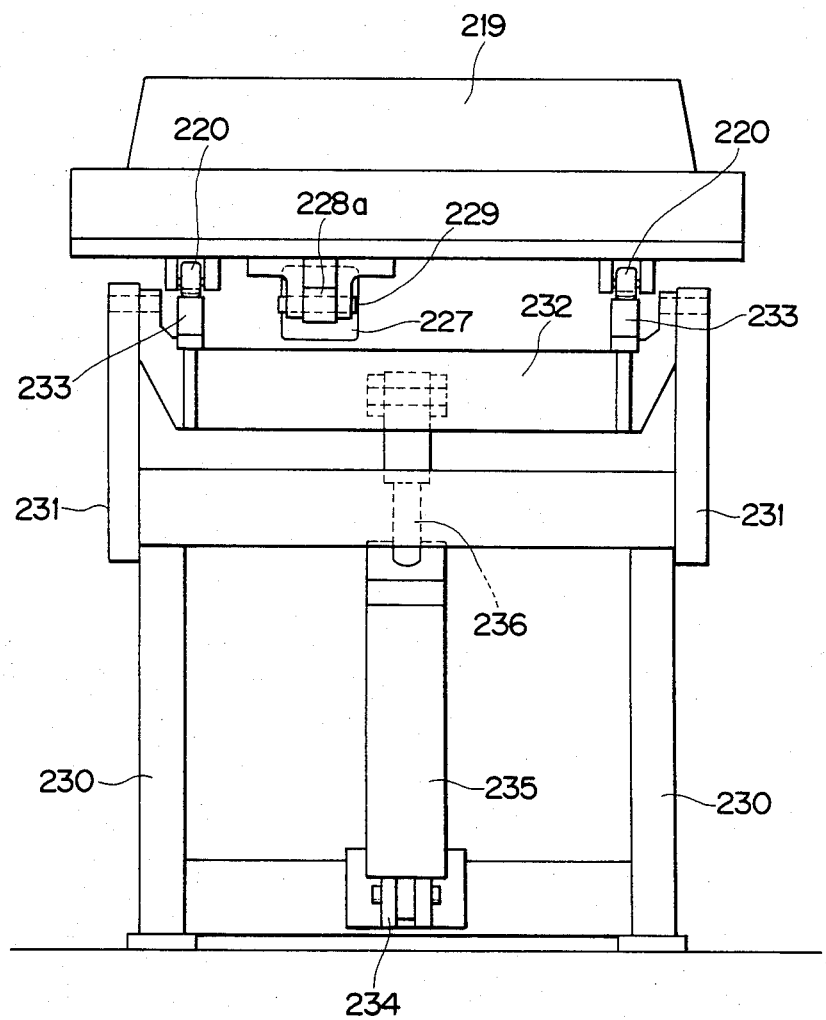
FIG. 17 is a front elevational view showing a base block shown in FIG. 16.

FIGS. 16 and 17 show a lower die 219 mounted at the base block 202 in such a manner as to have both ends thereof placed on the upper surface of the base block 202 and only the outer end thereof can be viewed in the drawing figures. At the lower surface of the lower die 219 are mounted a plurality of moving rollers 220. In the base block 202 below the lower die 219 are arranged lift cylinders 221 directed upwardly, and the upper ends of rods 222 in the lift cylinders 221 have rails 223 fixed thereon. Thus, in the condition in which the rods 222 are retracted, as shown at a right half part in FIG. 18, the rail 223 and the rollers 220 are spaced apart, and position setting pins 224 at the upper surface of the base block 202 are engaged with position setting holes 225 at the lower surface of the lower die 219. In the condition in which the rods 222 are lifted, as shown at a left half part in FIG. 18, the rollers 220 are placed on the rail 223 and then the lower die 219 is lifted up over the base block 202 under an operation of the cylinder 221.

At the rear surface of the base block 202 (right-hand side in FIG. 16) are arranged brackets 226 which pivotally support the base ends of slide cylinders 227 through a pin 250. Extremity ends 228a of rods 228 in the slide cylinders 227 are connected to the lower surface of the lower die 219.

In front of the base block 202 is disposed a supporting block 230 adjacent thereto and brackets 231 fixed to the front surface of the supporting block 230 pivotally support a formed item expelling block 232 through a pin 260. The expelling block 232 has rails 233 mounted at its upper surface and is connected at its lower surface to the extremity ends of rods 236 in hydraulic cylinders 235 which are rotatably arranged at brackets 234 in the supporting block 230. The expelling block 232 is inclined around the pivot pins 260 under a projecting operation of the cylinders 235. Rails 233 mounted in the expelling block 232 are at substantially the same level as that of the rails 223 fixed to the extremity ends 222a of rods 222 in the lift cylinder 221 while the expelling block 232 is horizontal, and also in this condition the rails 223 and 233 are set such that their ends are adjacent to each other.

Operation of the forming device constructed as described above will be described first with reference to an initial condition in which the expelling block 232 having the lower die 219 mounted thereon is inclined, as shown by a phantom line in the drawing figures, under a projecting operation of the cylinders 235.

At first, upon completion of placing of the instrument panel core member on the inclined lower die 219, the rods 236 in the cylinders 235 are retracted and the expelling block 232 is rotated around the pivot points 260 for the brackets 231 and set to its horizontal condition. Thereafter, the slide cylinders 227, having the extremity ends 228a of the rods 228 connected to the lower surface of the lower die 219, are operated, and the lower die 219 is retracted into the forming device 201. Then, the lower die 219 runs through the rollers 220 on the rails 233 of the expelling blocks 232 and moves onto the rails 223 in the base block 202. The lower die runs on the rails 223 and is conveyed into the forming device 201.

Thereafter, the rails 223 fixed to the extremity ends of the rods 222 are lowered under an expelling operation of the cylinders 221. Then, as shown in the right half part of FIG. 18, the lower die 219 is descended, its end part is placed on the base block 202 and then the position setting pins 224 are engaged with the position setting holes 225. In this manner, the lower die 219 having the core member set therein is set at the forming position.

Then, with reference to the arrangement described with respect to FIGS. 12 to 15, the unit sheet and the core member are forcibly pressed and formed between the upper and lower dies.

Figure 18:
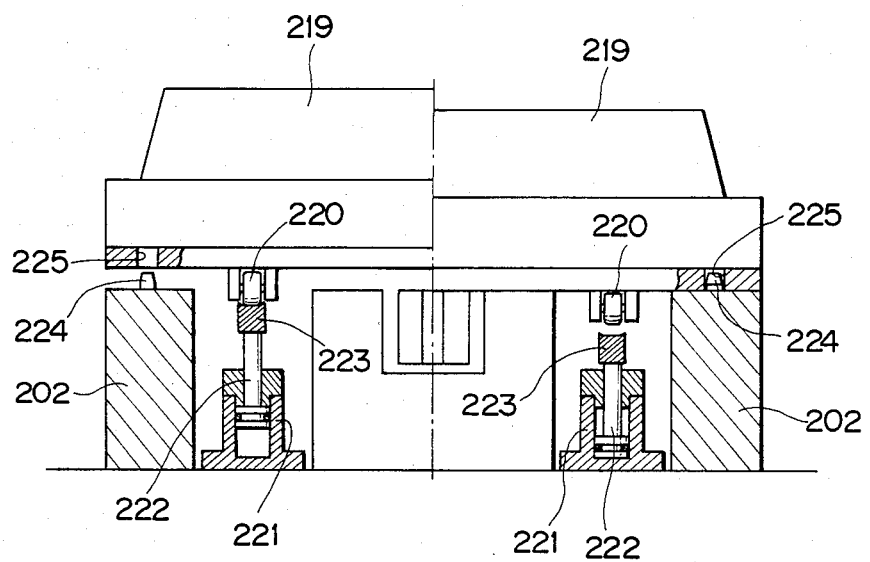
FIG. 18 is a partial section showing operations of a lower die in the forming device with two operations being composite, the right half thereof showing an engaged condition between the lower die and a base block, and left half thereof showing a condition of the lower die raised up and separated from the base block.

Upon completion of the forming, the cylinders 221 are operated to cause the rails 223, as shown in the left-half part in FIG. 18, to be lifted, and the lower die 219 to be raised while the rollers 220 are placed on the rails 223, and the rails 223 on the base block 202 are at substantially the same level as that of the rails 233 on the expelling block 232. Then, the rods 228 in the slide cylinders 227 are moved to project to cause the lower die 219 to be pushed forwardly along the rails 223.

Then, the lower die 219 is moved out of the forming device 201 and moved along the rails 233 on the expelling block 232, and placed on the expelling block 232. Upon projecting operation of the cylinders 235, the expelling block 232 is inclined while the lower die 219 is placed thereon, and the instrument panel can be expelled out of the lower die 219. In this manner, both a setting of the core member and an expelling of the formed product are performed.

Figure 19:
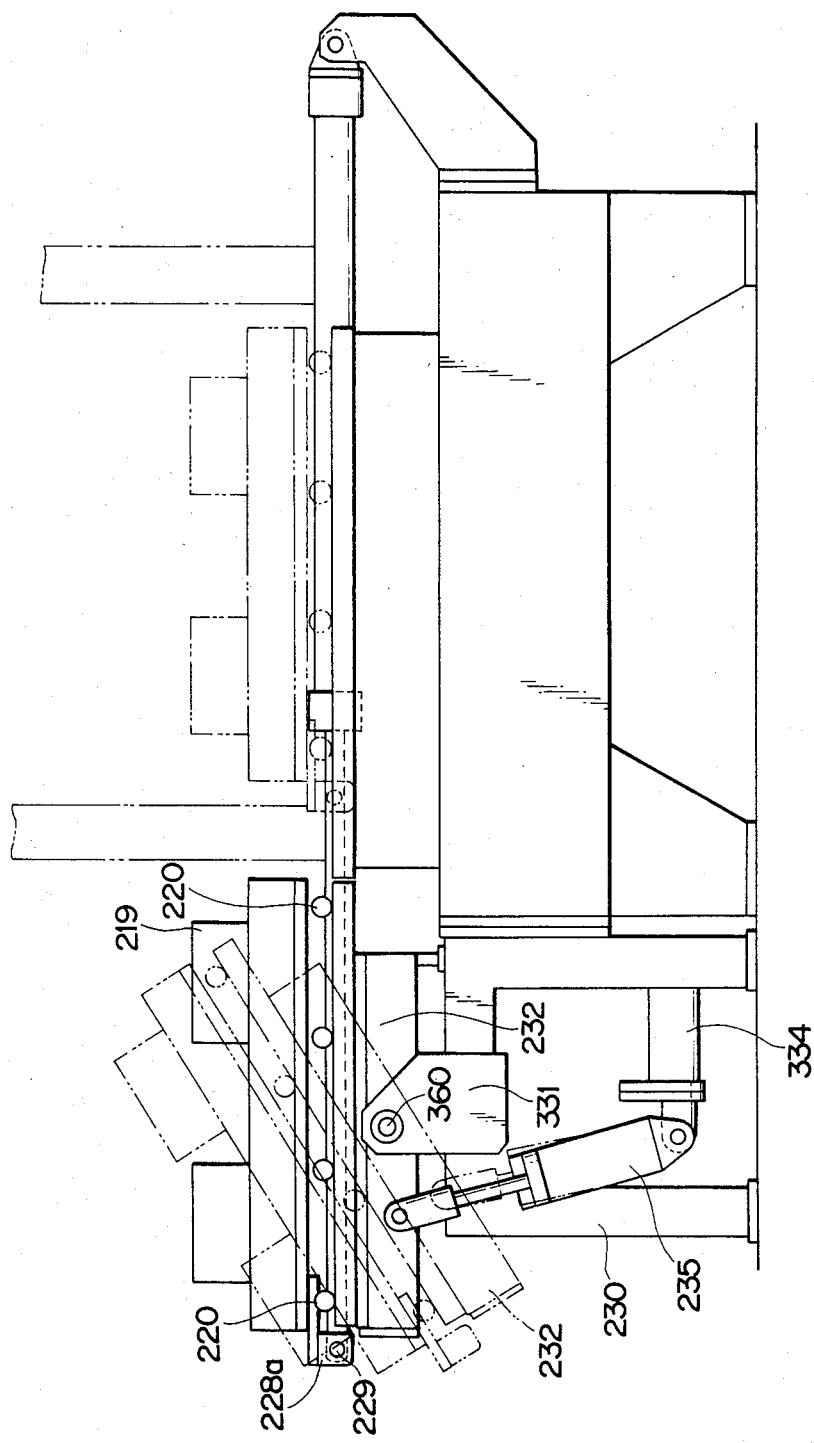
FIG. 19 is a view similar to FIG. 16, showing a modification of a product expelling block.

FIG. 19 shows another preferred embodimemt of the expelling block, wherein brackets 331 are arranged on the upper part of the supporting block 230 and the expelling block is pivotally supported by the brackets 331 through pins 360 at substantially a central part in the lower surface of the expelling block 232. The expelling block 232 and the rods 236 in the hydraulic cylinders 235 are connected at their front parts through the pins 360.

With the arrangement described above, the expelling block 232 can be inclined by the expelling operation of the rods 236 in the cylinders 235 with less force compared to that of the previous embodiment. In the previous embodiment, an inclination of the expelling block 232 sometimes causes a high setting of the core member and a high expelling position of the formed product. In the alternative embodiment, the former effects do not occur and the forming operation is facilitated.

When the expelling block 232 is inclined, because the extremity ends 228a of the rods 228 in the slide cylinders 227 are connected to the lower surface at the front end of the expelling block 232, the slide cylinders 227 are rotated downwardly around their base ends. This radius of rotation is different from that of the expelling block 232. However, this difference in radii of rotation is balanced under an operation in which the expelling block 232 is moved on the rails 233 in a forward and downward direction, so that the inclining operation is performed quite easily.

Overall operation of the instrument panel manufacturing system constructed in accordance with the present invention will be described as hereinbelow.

The sheet pallet 8 storing the sheets 7 therein is first placed in a lower part of the sheet feeding device 2. Then, the lift cylinder 17 is operated to cause the suction device 20 to be lowered and one unit sheet 7 is sucked up by the vacuum cups 19 in the suction device 20. The lift cylinder 17 is operated to cause the suction device 20 having the sheet 7 held therein to be lifted up to a position of the rails 14.

Then, the cylinders 16 are operated to cause the rods 16a to be projected and the engaging pieces 16b arranged at the extremity ends of the rods 16a are engaged with the engaging pieces 31 in the bogie 21 engaged with the lower rails 47 in the heating device 3. Thereafter, the cylinders 16 are operated to cause the rods 16a to be retracted therein. Because the rails 14 in the sheet feeding device 2 are lowered down to the same level as that of the lower rails 47 in the heating device 3, the bogie 21 is moved on the rails 47 and transferred on to the rails 14. At this time, the sheet guide plates 24, 24 arranged in the cross member 25 are entered beneath the sheet 7 and the end part of the sheet 7 is placed on the rectangular pipe 33 in the bogie 21.

Thereafter, as shown in FIG. 9(B), the cylinders 39, 39 arranged on the movable plate 11 are operated to cause the rods 39a to be retracted. Thereby, the operating arms 37 in the bogie 21 are rotated, the needles 38a in the clamp arms 38 spike into the end part of the sheet 7 to cause the sheet 7 to be held in the bogie 21 and then the suctioned condition of the sheet caused by the suction device 20 is released.

The lift cylinder 9 is operated to cause the movable plate 11, the rails 14 and the bogie 21 engaged with the rails 14 to be lifted up to the same level as that of the upper rails 46 in the heating device 3. Then, the cylinders 16 are operated to cause the rods 16a to be projected. Because the engaging pieces 16b at the extremity ends of the rods 16a are engaged with the engaging parts 31 in the bogie 21, the bogie 21 is moved on the rails 14 while the sheet 7 is held therein, and moved onto the upper rails 46 in the heating device 3. The engaged condition of the engaging members 31 and the engaging pieces 16b are released in the heating device 3. In the heating device, the sheet is heated to its approximate melting point.

Upon completion of the heating process, the lift cylinders 56 in the forming device 4 are operated to cause the auxiliary rams 59 to be lifted up and the rails 61 arranged in the auxiliary rams 59 to be placed at the same level as the upper rails 46. In this condition, the cylinders 62 are operated to cause the rods 62a to be projected and the engaging pieces 62b arranged at the extremity ends of the rods 62a to be fitted to the grooves 30a in the engaging member 30 formed in the lateral member 22 in the bogie 21. In condition, the cylinders 62 are operated to cause the rods 62a to be retracted. The bogie 21 is moved on the upper rails 46 in the heating device 3 while it holds the sheet 7 heated up to its approximate melting point, and is moved onto the rails 61 and conveyed into the forming device. The condition of the upper die 55, sheet 7 and lower die 66 in the forming device 4 is as shown in FIG. 14.

Then, the lift cylinder 52 and the lift cylinders 56 are operated to cause the upper die 55 and the auxiliary rams 59 to be lowered. When the sheet 7 is held between the lower die 66 having the core member 65 mounted thereon and the upper die 55, or just before holding of the sheet, a holding condition of the sheet 7 in the bogie 21 is released under an operation of the cylinders 63 fixed to the movable plate 58. Further descending movement of the upper die 55 causes the sheet 7 between the upper die 55 and the lower die 66 to be forcibly contacted to the core member 65 having adhesive 65a coated thereon at its upper surface. This condition is shown in FIG. 15. Upon completion of the forming operation, the upper die 55 is raised up to its original position under an operation of the lift cylinder 52.

The vacant bogie 21 is lowered to the same level as that of the lower rails 47 in the heating device 3 by descending the auxiliary rams 59, and then the bogie 21 is moved on the rails 61 under a projecting operation of the rods 62a performed by the cylinders 62 and moved onto the lower rails 47 in the heating device 3, and returned to its original condition.

In turn, the lower die 66 having completed the forming operation is moved onto the expelling block 68 placed in front of the base block 49 under an operation of the cylinder 69. Further operation of the cylinders 71 causes the expelling block 68 to be inclined and the formed instrument panel is expelled out of the block. Thereafter, the expelling block 68 is set to a horizontal condition, and the lower die 66 is returned to its original position to complete one cycle.

As apparent from the above description, the instrument panel manufacturing device of the present invention has the following advantages. Because the present invention provides separate running rails for each of the stations, and a conveyor chain circulating through each of the stations found in the prior art is not applied, and the bogie having the sheet held therein is moved, the sheet is not required to be conveyed while a relative positional relation between each of the stations is maintained, the most suitable processing condition can be selected for each of the stations. Further, because the conveyor chain is not passed through the heating device, durability of the conveyor is improved, and the forming process is not restricted due to the fact that the sheet is not needed to be formed while it is held in the conveyor chain.

Serial arrangement of the drying chamber for adhesive coated on a surface of the core member and a melting chamber eliminates the prior art requisite of having the drying device arranged separately from the melting device. Thus, an installation area of the device can be minimized as much as possible, only one device fulfills the requirement of performing operations, an inexpensive or low cost unit can be provided, and an operation for conveying the core member having a dried adhesive thereon to the melting device is not required.

The arrangement in which the drying chamber and the melting chamber are separated by the shutter and the heater can be moved up and down facilitates a provision of accepting different temperature conditions, i.e. drying and melting temperatures, and a circulation of the exhaust gas may improve thermal efficiency as much as possible.

Because the suction device for the unit sheet can be moved up and down and the running rails for the bogie for conveying the unit sheet can be moved up and down between the unit sheet transferring position and the sheet conveying position, both a suction of the unit sheet and a transferring of the sheet to the subsequent step can be performed in one device in the feeding station. Thus, setting time can be shortened, only one device can fulfill the requirement of operations and an area occupied by the device can be reduced as much as possible.

Because the auxiliary rams which are moved up and down in no relation with the lifting movement of the upper die are installed in the forming device and the running rails for the bogie for removably holding the unit sheet are arranged in the auxiliary rams, the unit sheet can be formed at any desired positions and the movement of the lower die is not required, and the forming process is not restricted.

Because the lower die can be moved along the rails on the base block and the item expelling block having rails on which the lower die runs is installed in such a manner that it may be inclined, both a setting of the formed product in the forming device and an expelling of the formed product can be performed easily and safely and the mechanism itself is not complicated and the workability of the device can be improved.

Because the clamp device is arranged in the unit sheet conveying bogie, the unit sheet may be engaged or disengaged more easily than in the conventional process, and no restriction is imposed on the forming cycle.

What is claimed is:

1. An instrument panel manufacturing system comprising:
    means for feeding a unit sheet;
    means for heating said sheet;

means for pressing said heated sheet against a core member having adhesive coated on a surface thereof and for forming it thereon;

first rails being included in said feeding means and being movable up and down between a raised position and a lowered position, and substantially extending in a lateral direction;

upper rails and lower rails arranged in said heating means at each of the locations corresponding to said raised position and said lowered positions, respectively;

heater means arranged along the upper side and lower side of said upper rails;

auxiliary rams in said forming means which are movable up and down between a first position and a second position, each of which positions corresponds to said upper rails and said lower rails of said heating means, respectively;

second rails fixed to said auxiliary rams;

a bogie which can be run on said first rails, said upper rails, said lower rails and said second rails and removably holds said unit sheet;

said bogie being provided with clamp means for removably holding said unit sheet by clamping the end thereof; and a driving means for advancing and retracting said bogie.

2. An instrument panel manufacturing system as set forth in claim 1 comprising;

means for drying and melting the adhesive coated on the surface of said core member;

said means for drying and melting adhesive having a drying chamber for drying said adhesive, and a melting chamber arranged in continuous relation with said drying chamber and having a heater arranged therein to heat said dried adhesive and melt the same; and conveying means for conveying said core member through said drying chamber and said melting chamber.

3. An instrument panel manufacturing system as set forth in claim 2 in which a shutter for defining said drying chamber and said melting chamber is arranged therebetween; and said melting chamber is formed with an expelling opening for said core member which can be opened or closed.

4. An instrument panel manufacturing system as set forth in claim 2 in which said heater arranged in said melting chamber can be moved up and down.

5. An instrument panel manufacturing system as set forth in claim 1 in which said feeding means includes a suction means which can be moved up and down, and is provided with suction elements for sucking said unit sheet and holding it.

6. An instrument panel manufacturing system as set forth in claim 1 in which said forming means further includes;

a base block provided with a lower die on which said core member is mounted;

columns arranged vertically on said base block; and a movable plate provided with an upper die and inserted onto said columns in such a way as it may be moved up and down thereon; and said auxiliary rams are fitted on said columns between said base block and said movable plate.

7. An instrument panel manufacturing system as set forth in claim 6, wherein:

said lower die is provided at its lower surface with moving rollers;

said forming means further includes third rails arranged below said lower die which can be moved up and down and on which said rollers are mounted at their upper limit position;

slide cylinders are provided for moving said lower die along said third rails;

a formed item expelling block is arranged adjacent said base block; and fourth rails are arranged on said expelling block and positioned at the locations corresponding to said third rails at their upper limit positions.

8. An instrument panel manufacturing system as set forth in claim 7 in which said slide cylinders are pivotally supported on said base block, and said formed item expelling block is inclinable.

9. An instrument panel manufacturing system as set forth in claim 8 in which a pivot point for inclination of said item expelling block is positioned substantially at a central part of said item expelling block in its longitudinal direction.

10. An instrument panel manufacturing system as set forth in claim 1, wherein:

said bogie includes:

a pair of substantially parallel lateral members;

a substantially vertical member arranged between the ends of said lateral member disposed rearwardly with respect to a conveying direction;

clamp means arranged along said lateral members for removably holding the end part of said unit sheet; and engaging members arranged at the front and rear ends of at least one of said lateral members and engageable with a part of said bogie driving means.

11. An instrument panel manufacturing system comprising:

means for feeding a unit sheet;

means for heating said sheet;

means for pressing said heated sheet against a core member having adhesive coated on a surface thereof and for forming it thereon;

first rails being included in said feeding means and being movable up and down between a raised position and a lowered position, and substantially extending in a lateral direction;

upper rails and lower rails arranged in said heating means at each of the locations corresponding to said raised position and said lowered positions, respectively;

heater means arranged along the upper side and lower side of said upper rails;

auxiliary rams in said forming means which are movable up and down between a first position and a second position, each of which positions corresponds to said upper rails and said lower rails of said heating means, respectively;

second rails fixed to said auxiliary rams;

a bogie which can be run on said first rails, said upper rails, said lower rails and said second rails and removably holds said unit sheet;

a driving means for advancing and retracting said bogie;

means for drying and melting the adhesive coated on the surface of said core member;

said means for drying and melting adhesive having a drying chamber for drying said adhesive, and a melting chamber arranged in continuous relation with said drying chamber and having a heater arranged therein to heat said dried adhesive and melt the same; and conveying means for conveying said core member through said drying chamber and said melting chamber.

12. An instrument panel manufacturing system as set forth in claim 11, wherein:

a shutter for defining said drying chamber and said melting chamber is arranged therebetween; and said melting chamber is formed with an expelling opening for said core member which can be opened or closed.

13. An instrument panel manufacturing system as set forth in claim 11, wherein:

said heater arranged in said melting chamber can be moved up and down.

14. An instrument panel manufacturing system comprising:

means for feeding a unit sheet;

means for heating said sheet;

means for pressing said heated sheet against a core member having adhesive coated on a surface thereof and for forming it thereon;

first rails being included in said feeding means and being movable up and down between a raised position and a lowered position, and substantially extending in a lateral direction;

upper rails and lower rails arranged in said heating means at each of the locations corresponding to said raised position and said lowered positions, respectively;

heater means arranged along the upper side and lower side of said upper rails;

auxiliary rams in said forming means which are movable up and down between a first position and a second position, each of which positions corresponds to said upper rails and said lower rails of said heating means, respectively;

second rails fixed to said auxiliary rams;

a bogie which can be run on said first rails, said upper rails, said lower rails and said second rails and removably holds said unit sheet;

a driving means for advancing and retracting said bogie;

said forming means further including:

a base block provided with a lower die on which said core member is mounted;

columns arranged vertically on said base block;

a movable plate provided with an upper die and inserted onto said columns in such a way as it may be moved up and down thereon;

said auxiliary rams being fitted on said columns between said base block and said movable plate;

said lower die being provided at its lower surface with moving rollers;

third rails arranged below said lower die which can be moved up and down and on which said rollers are mounted at their upper limit position;

slide cylinders provided for moving said lower die along said third rails;

a formed item expelling block arranged adjacent said base block; and fourth rails arranged on said expelling block and positioned at the locations corresponding to said third rails at their upper limit positions.

15. An instrument panel manufacturing system as set forth in claim 14, wherein:

said slide cylinders are pivotally supported on said base lock; and said formed item expelling block is inclinable.

16. An instrument panel manufacturing system as set forth in claim 15, wherein:

a pivot point for inclination of said item expelling block is positioned substantially at a central part of said item expelling block in its longitudinal direction.

17. An instrument panel manufacturing system comprising:

means for feeding a unit sheet;

means for heating said sheet;

means for pressing said heated sheet against a core member having adhesive coated on a surface thereof and for forming it thereon;

first rails being included in said feeding means and being movable up and down between a raised position and a lowered position, and substantially extending in a lateral direction;

upper rails and lower rails arranged in said heating means at each of the locations corresponding to said raised position and said lowered positions, respectively;

heater means arranged along the upper side and lower side of said upper rails;

auxiliary rams in said forming means which are movable up and down between a first position and a second position, each of which positions corresponds to said upper rails and said lower rails of said heating means respectively;

second rails fixed to said auxiliary rams;

a bogie which can be run on said first rails, said upper rails, said lower rails and said second rails and removably holds said unit sheet;

a driving means for advancing and retracting said bogie;

said bogie including:

a pair of parallel lateral members;

a substantially vertical member arranged between the ends of said lateral member disposed rearwardly with respect to a conveying direction;

clamp means arranged along said lateral members for removably holding the end part of said unit sheet; and engaging members arranged at the front and rear ends of at least one of said lateral members and engageable with a part of said bogie driving means.

* * * * *